United States Patent
Gou et al.

(10) Patent No.: US 10,282,467 B2
(45) Date of Patent: May 7, 2019

(54) MINING PRODUCT ASPECTS FROM OPINION TEXT

(71) Applicant: International Business Machines Corporation, Armonk, NY (US)

(72) Inventors: Liang Gou, San Jose, CA (US); Mengdie Hu, Atlanta, GA (US); Yunyao Li, San Jose, CA (US); Huahai Yang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/315,378

(22) Filed: Jun. 26, 2014

(65) Prior Publication Data

US 2015/0379090 A1    Dec. 31, 2015

(51) Int. Cl.
*G06F 17/30* (2006.01)
*G06F 17/27* (2006.01)

(52) U.S. Cl.
CPC ...... *G06F 17/30699* (2013.01); *G06F 17/271* (2013.01); *G06F 17/277* (2013.01); *G06F 17/30719* (2013.01)

(58) Field of Classification Search
CPC ......... G06F 17/30539; G06F 17/30011; G06F 17/30867; G06F 17/21; G06F 17/271; G06F 17/2765; G06F 17/277; G06F 17/278
See application file for complete search history.

(56) References Cited

U.S. PATENT DOCUMENTS

| | | | |
|---|---|---|---|
| 7,136,080 B1 * | 11/2006 | Kaminagayoshi | A63F 13/10 345/619 |
| 7,987,184 B2 * | 7/2011 | Ishitani | G06F 17/30637 707/727 |
| 7,987,188 B2 | 7/2011 | Neylon et al. | |
| 8,417,713 B1 | 4/2013 | Blair-Goldensohn et al. | |
| 8,799,773 B2 | 8/2014 | Reis et al. | |
| 2005/0080613 A1 * | 4/2005 | Colledge | G06F 17/2785 704/9 |
| 2008/0243487 A1 * | 10/2008 | Dayan | G06F 17/277 704/10 |
| 2008/0249764 A1 | 10/2008 | Huang et al. | |
| 2009/0193328 A1 | 7/2009 | Reis et al. | |

(Continued)

OTHER PUBLICATIONS

Verb and Adjective Definition, Google Search. pp. 1-2.*

(Continued)

*Primary Examiner* — Amanda L Willis
(74) *Attorney, Agent, or Firm* — Erik K. Johnson (57) ABSTRACT

A text stream having one or more sentences is received, and any number of the one or more sentences are parsed to determine corresponding subject-verb-object (SVO) triples. Each sentence whose corresponding SVO triple contains an identified verb is selected, based on the identified verb, or a lemma of the identified verb, matching a predefined verb. A subject of each selected sentence is identified as an aspect candidate. Each identified aspect candidate is tokenized and normalized. One or more n-grams are generated for each tokenized and normalized aspect candidate. For each generated n-gram, a frequency at which the n-gram is generated is determined. A number of the generated n-grams are selected as aspects based on the frequency with which the number of n-grams are generated.

20 Claims, 6 Drawing Sheets

(56) References Cited

U.S. PATENT DOCUMENTS

| | | | |
|---|---|---|---|
| 2009/0319342 | A1 | 12/2009 | Shilman et al. |
| 2012/0209751 | A1 | 8/2012 | Chen et al. |
| 2012/0239379 | A1* | 9/2012 | Gershnik .............. G06F 17/275 704/8 |
| 2013/0091117 | A1 | 4/2013 | Minh |
| 2013/0151538 | A1 | 6/2013 | Dmitriev et al. |
| 2014/0067370 | A1* | 3/2014 | Brun .................... G06F 17/271 704/9 |
| 2015/0089409 | A1* | 3/2015 | Asseily ................. G06Q 10/10 715/765 |
| 2015/0317303 | A1 | 11/2015 | Zhang et al. |

OTHER PUBLICATIONS

Liu, "Sentiment Analysis and Opinion Mining", Draft, Morgan & Claypool Publishers, May 2012, 168 pages.

Yu et al., "Aspect Ranking: Identifying Important Product Aspects from Online Consumer Reviews", Proceedings of the 49th Annual Meeting of the Association for Computational Linguistics, pp. 1496-1505, Jun. 19-24, 2011.

Blair-Goldensohn et al., "Building a Sentiment Summarizer for Local Service Reviews," WWW 2008, Beijing, China, Apr. 21-25, 2008.

Krestel et al., "Generating Contextualized Sentiment Lexica based on Latent Topics and User Ratings", 24th ACM Conference on Hypertext and Social Media, Paris, France, May 1-3, 2013.

Bakliwal, "Fine-Grained Opinion Mining from Different Genre of Social Media Content", Thesis submitted in partial fulfillment of the requirements for the degree of MS by Research in Computer Science and Engineering, Hyderabad, India, Apr. 2013, pp. 1-75.

Wu et al., "OpinionSeer: Interactive Visualization of Hotel Customer Feedback", Aug. 1, 2010.

Jo et al., "Aspect and Sentiment Unification Model for Online Review Analysis", WSDM'11, Feb. 9-12, 2011, Hong Kong, China.

Gilbert et al., "Understanding Deja Reviewers", CSCW 2010, Feb. 6-10, 2010.

Carenini et al., "A Multimedia Interface for Facilitating Comparisons of Opinions", IUI '09, Feb. 8-11, 2009.

Hu et al., "Mining and Summarizing customer Reviews", KDD '04, Aug. 22-25, 2004.

Mukherjee et al., "Aspect Extraction through Semi-Supervised Modeling", ACL, pp. 339-348, Date Received: Jun. 26, 2014.

Rohrdantz et al., "Feature-based Visual Sentiment Analysis of Text Document Streams", ACM, 2012.

Yatani et al., "Review Spotlight: A User Interface for Summarizing User-generated Reviews Using Adjective-Noun Word Pairs", CHI 2011, May 7-12, 2011, Vancouver, Canada.

Liu et al., "A Survey of Opinion Mining and Sentiment Analysis", 2012, Mining Text Data, Chapter A, Kluwer Academic Publishers.

Moghaddam et al., "ILDA: Interdependent LDA Model for Learning Latent Aspects and their Ratings from Online Product Reviews", SIGIR'11, Jul. 24-28, 2011, Beijing, China, pp. 665-674.

Thet et al., "Aspect-Based Sentiment Analysis of Movie Reviews on Discussion Boards", Journal of Information Science, vol. 36, No. 6, 2010, pp. 823-848.

Hu et al., "OpinionBlocks: A Crowd-Powered, Self-improving Interactive Visual Analytic System for Understanding Opinion Text", Interact 2013, Part II, LNCS 8118, pp. 116-134, 2013.

Mell et al., "The NIST Definition of Cloud Computing", Version 15, Oct. 7, 2009, National Institute of Standards and Technology, Information Technology Laboratory.

IBM: List of IBM Patents or Patent Application Treated as Related (Appendix P), Apr. 28, 2016, pp. 1-2.

Gou et al., Pending U.S. Appl. No. 15/140,515, filed Apr. 28, 2016, titled "Mining Product Aspects From Opinion Text", pp. 1-35.

* cited by examiner

MINING PRODUCT ASPECTS FROM OPINION TEXT

FIELD OF THE INVENTION

The present disclosure generally relates to automated textual analysis, and more particularly to determining textually expressed sentiments.

BACKGROUND

Unstructured digital data such as unstructured digital text data often contains useful information. This information may be latent and therefore not readily accessible to a user. For example, opinions expressed in online reviews for a product may help a potential buyer decide whether to purchase that product. The product may be associated with thousands of reviews, and reading more than a handful of the reviews may be impractical for the buyer. In another example, a discussion thread in an online forum may contain hundreds or thousands of posts. It may be impractical for a single forum user to review each post. The result may be that potentially valuable the information in such reviews or posts goes unused.

BRIEF SUMMARY

Embodiments of the present disclosure provide a method, system, and computer program product for extracting an aspect from a text stream. A text stream having one or more sentences is received, and any number of the one or more sentences are parsed to determine corresponding subject-verb-object (SVO) triples. Each sentence whose corresponding SVO triple contains an identified verb is selected, based on the identified verb, or a lemma of the identified verb, matching a predefined verb. A subject of each selected sentence is identified as an aspect candidate. Each identified aspect candidate is tokenized and normalized. One or more n-grams are generated for each tokenized and normalized aspect candidate. For each generated n-gram, a frequency at which the n-gram is generated is determined. A number of the generated n-grams are selected as aspects based on the frequency with which the number of n-grams are generated.

DETAILED DESCRIPTION

Generally, embodiments of the present disclosure provide for extraction of Aspects from text. According to one embodiment, an Aspect may correspond to an n-gram generated using a subject of the text.

Figure 1:
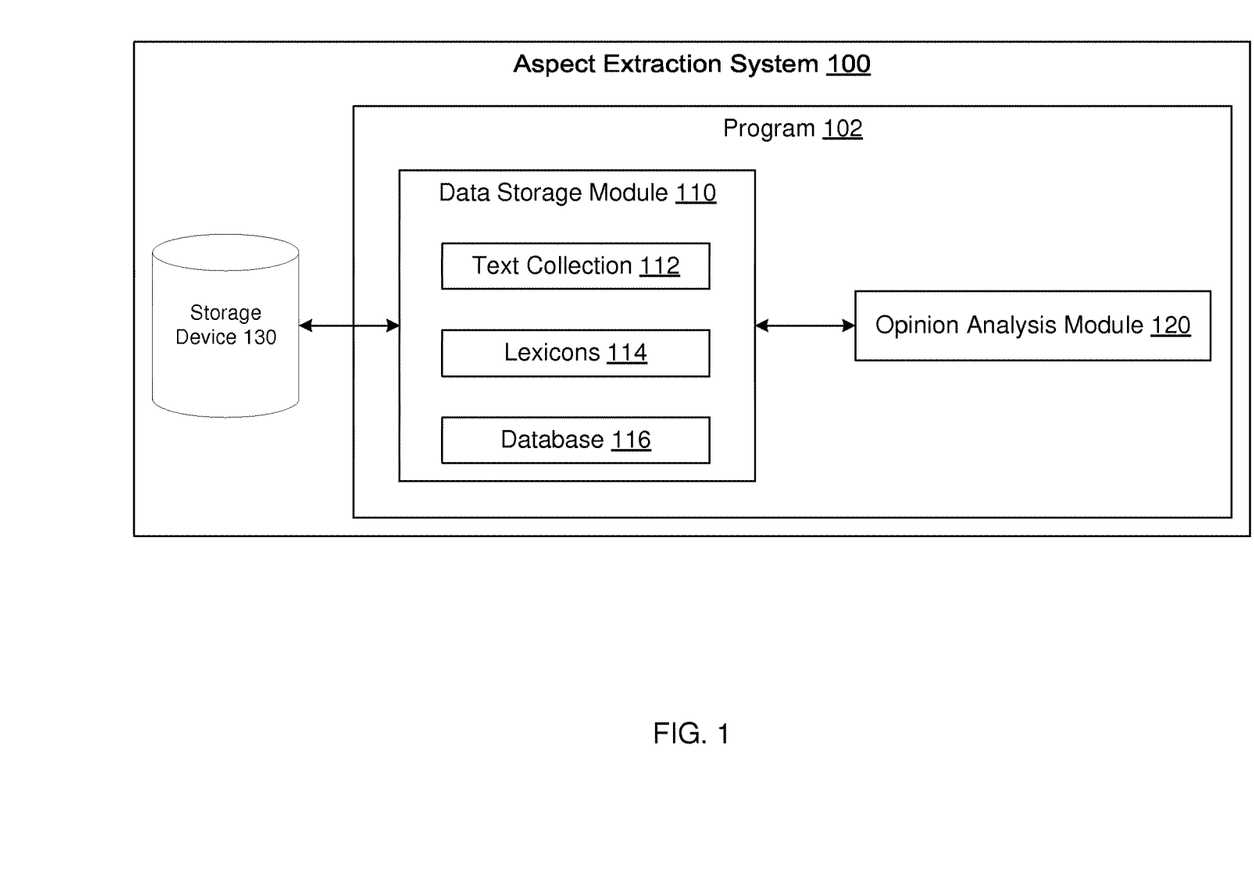
FIG. 1 is a block diagram of a computer system for extracting aspects from text, according to an embodiment of the present disclosure.

FIG. 1 is a block diagram of an Aspect Extraction System 100 for extracting one or more Aspects from text, according to an embodiment of the present disclosure. The Aspect Extraction System 100 may be a computing device having a tangible Storage Device 130 and a Program 102 for execution by a processor (not shown). The Program 102 may include a Data Storage Module 110 that loads and stores one or more of the following data types from/to the Storage Device 130 (or from/to another tangible storage device): Text Collection(s) 112, Lexicon(s) 114, and Database(s) 116. The Program 102 may also include an Opinion Analysis Module 120 which may communicate with the Data Storage Module 110 to obtain data to analyze, and to provide analysis results that may be stored on the tangible Storage Device 130. The Opinion Analysis Module 120 may perform a variety of analysis functions including, for example, extracting Aspects from text loaded by the Data Storage Module 110.

The Aspect Extraction System 100 may be a computing device such as the device described in connection with FIG. 4, below. For example, the Aspect Extraction System 100 may be a server, laptop, desktop, or mobile device. Each such device may include, for example, a processor, one or more tangible storage devices, one or more programs stored on the one or more tangible storage devices, or another tangible storage device, for execution by the processor, one or more I/O devices, networking components, and other components and/or peripherals. The Aspect Extraction System 100 may be operatively connected to one or more other systems or devices via, for example, a communications network using, for example, a LAN or WAN protocol.

The Text Collection 112 data type loaded/stored by the Data Storage Module 110 from/onto the Storage Device 130 and used by the Opinion Analysis Module 120 may include a collection of text streams. A text stream may include one or more of: characters, words, phrases, clauses, sentences, paragraphs, or any other grouping of text data. Text streams may be in structured or unstructured format. Structured text streams may have a predefined or predetermined significance (e.g., a set of text elements may be identified as forming part of a sentence having identified boundaries). Unstructured text streams may include the same text stream as structured text, without information as to the text stream's definition, structure, or significance. Structured text streams may include, without limitation, online product reviews, posts on online discussion forums; social media posts; digital text documents; online advertisements or testimonials; or a combination thereof.

According to an embodiment of the present disclosure, the Text Collection 112 may include text streams that can be classified as opinion text. Opinion text may include text streams that specify or relate to a subject of the opinion text, and individually or collectively convey a sentiment towards that subject. An example of opinion text may be the sentence $S_1$: "The display is made from highly damage-resistant glass." In this example, a subject of the sentence may be "the display", and "highly damage resistant" may be an opinion that is directly or indirectly expressed towards that subject. Whether a given text stream may be classified as opinion text may be determined by the System's 100 Opinion Analysis Module 120 using the given text stream, and/or related text streams, in conjunction with the Lexicons 114 and other configurations of the Aspect Extraction System 100. For example, certain words or phrases, such as "highly damage-resistant", may be predefined as being indicative of sentiment.

According to an exemplary embodiment of the present disclosure, the Text Collection 112 may be a collection of product (or service) reviews. A product review may include a text stream that is associated with a product (which may be offered for sale), wherein the product may be the subject of the product review. The product review may include opinion text that expresses an opinion towards the product. Continuing with the above example of $S_1$, a product review may be: "The display is made from highly damage-resistant glass." In this example, the "display" may be the subject/product, and "highly damage-resistant" may be an opinion expressed towards the product. Another product review relating to the display may include opinion text regarding the display's price. For example, another product review may be, "The display is expensive." Alternatively, both of these sentences may be part of a single, multi-sentence product review.

The Opinion Analysis Module 120 may analyze text, or text streams, received from the Text Collection 112 by using, in part, the Lexicons 114. The Lexicons 114 may include predefined characters, words, phrases, clauses, sentences, paragraphs, or any other grouping of text that are defined to have a meaning and/or significance. For example, a word in the Lexicon 114 may have a meaning, and a grammatical role or significance (for example, the word may be a subject, object, verb, punctuation, etc.). The word's significance may be relative to other words or determined based on context, such that a word may have a different significance and/or grammatical role depending on the context in which it is used. In one embodiment, depending on its context, for example, a given word or phrase may be defined to convey sentiment, whereas it may convey no such sentiment in another context.

For example, in the case of $S_1$, "The display is made from highly damage-resistant glass.", the Opinion Analysis Module 120 may analyze each element of the sentence using the Lexicons 114 to determine, for each element, its meaning, whether it is part of a broader text element (for example, whether it is a word or phrase in a sentence), and its significance, such as its grammatical role.

The Database Module 116 may store the data that the Opinion Analysis Module 120 generates, and may load such data for future use. Such data may include, for example, comparison results, extracted subjects, tokenization and normalization data, generated n-grams, frequency analysis results, and aspect selection results, and other information, as will be discussed in greater detail with respect to FIG. 2, below.

Figure 2:
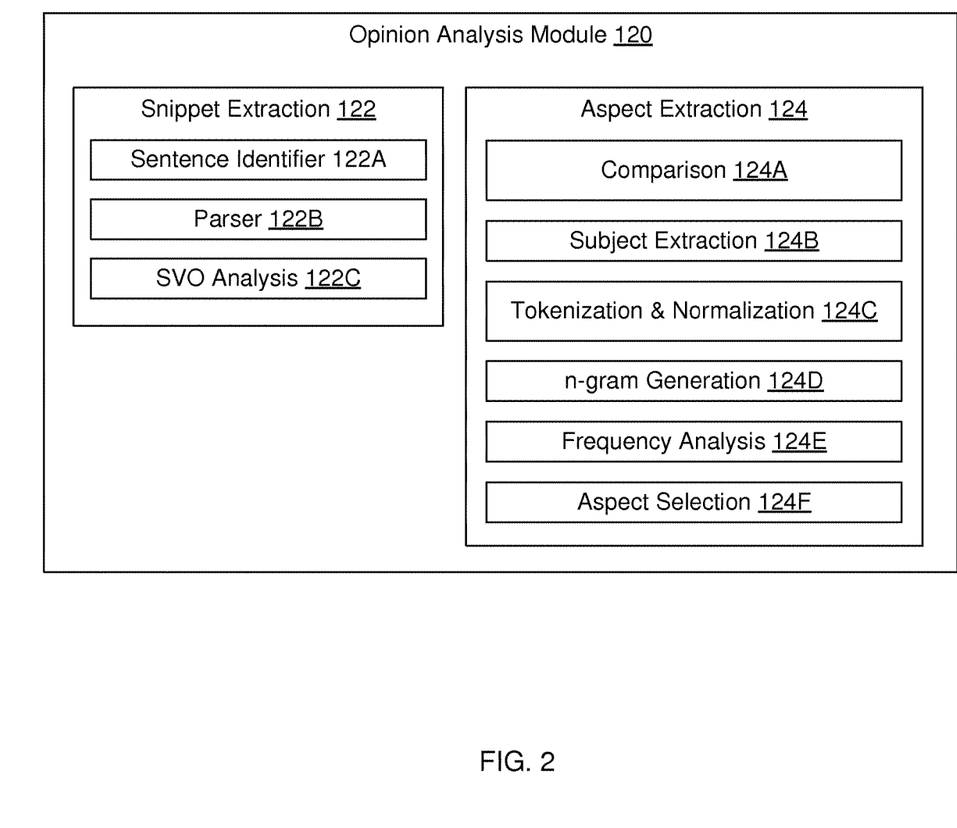
FIG. 2 is a block diagram depicting details of an opinion analysis module of the computer system of FIG. 1, according to an embodiment of the present disclosure.

FIG. 2 is a block diagram depicting component modules of the Opinion Analysis Module 120 of the Aspect Extraction System 100 depicted in FIG. 1, according to an embodiment of the present disclosure. The Opinion Analysis Module 120 may include one or more of the following modules: a Snippet Extraction Module 122 and an Aspect Extraction Module 124. Generally, the Snippet Extraction Module 122 identifies a subset or "snippet" of a text stream, such as portions of an online product review, that may yield useful information upon further processing. The Aspect Extraction Module 124 may generally process the snippet to extract Aspect candidates from the snippet, and to extract or select one or more Aspects based on the extracted Aspect candidates.

The Snippet Extraction Module 122 may include one or more of the following modules: a Sentence Identifier Module 122A, a Parser Module 122B, and a SVO Analysis Module 122C. Through the use of these modules, the Snippet Extraction Module 122 may receive, identify, and/or analyze text streams contained in the Text Collection 112 and loaded by the Data Storage Module 110. The results of the analysis performed by the Snippet Extraction Module 122 may be used by other modules of the Opinion Analysis Module 120, such as the Aspect Extraction Module 124, to perform additional analysis of the Text Collection 112.

According to an embodiment of the present disclosure, the Sentence Identifier Module 122A may receive text streams in the Text Collection 112 from the Data Storage Module 110, and identify each sentence therein. Each text stream may include a single sentence or a set of sentences (sentences need not be grammatically complete or correct). The Sentence Identifier Module 122A may identify each sentence S in each text stream that it receives. It may do so by, for example, identifying sentence boundaries using punctuation marks that delineate sentence boundaries, such as those in the set {. ! ? ; :}.

For example, a product review $R_1$ may include the following text stream: "The display is made from highly damage-resistant glass. The display is expensive. It takes one hour for the device to fully charge." In this example, the Sentence Identifier Module 122A may identify three sentences in $R_1$: $S_1$, comprising "The display is made from highly damage-resistant glass."; $S_2$, comprising "The display is expensive."; and $S_3$, comprising "It takes one hour for the device to fully charge."

The Parser Module 122B may parse each sentence S identified by the Sentence Identifier Module 122A for each text stream (for example, for each product review R) that it receives. Parsing may include identifying the grammatical structure of a sentence and its constituent elements using, for example, the Lexicons 114. The results may be organized as a parse tree. For example, the Parser Module 122B may generate a dependency parse, a typed dependency parse, a phrase structure parse, etc. Each parsed sentence S may have a corresponding parse tree T. In one embodiment, the Parser Module 122B may include the Stanford Parser and may generate its results using the Stanford Dependencies representation. In another embodiment, the Parser Module 122B may include the Apache OpenNLP™ parser.

In the case of the sentence $S_1$ in the above example, $S_1$ may have a corresponding parse tree $T_1$, based on an embodiment that uses the Stanford Parser, which may be as in TABLE 1, below:

TABLE 1

Example Parse Tree $T_1$ for the Sentence $S_1$:
"The display is made from highly damage-resistant glass."

(ROOT
 (S
  (NP (DT The) (NN display))
  (VP (VBZ is)
   (VP (VBN made)
    (PP (IN from)
     (NP
      (ADJP (RB highly) (JJ damage-resistant))
      (NN glass))))))))

The SVO Analysis Module 122C may analyze each parse tree T (corresponding to a sentence S) to identify subject-verb-object (SVO) triples within S, as determined by the Parser Module 122B. In determining SVO triples, the SVO Analysis Module 122C may use one or more lemmas of the identified subject, verb, or object of S.

A lemma may be defined, in one embodiment of the present disclosure, as a canonical form, dictionary form, or citation form of a set of words that do not necessarily share a stem with such form or with each other. Lemmatization may refer to a process whereby different inflected forms of a word are grouped together so they can be analyzed as a single item. Lemmatization may also refer to the process of determining a lemma for a given text element, such as a word. For example, the word "go" is an irregular verb having conjugated forms that do not share any stem with the word "go". The word "go" may be defined as a lemma for all conjugated forms of the verb "to go", such as those in the set {go, goes, went, gone}.

For example, in the case of $S_1$ in TABLE 1, above, the SVO Analysis Module 122C may determine, based on $T_1$, that $S_1$ includes the subject "the display", the verb "is made", and the object "glass". The SVO Analysis Module 122C may normalize or lemmatize the verb "is made" to "make", where "make" may be a predefined lemma for "made". Accordingly, the corresponding SVO triple of $S_1$ may be: <the display, make, glass>. Alternatively, the object may be "damage resistant-glass" or "highly damage-resistant glass."

The SVO triples generated by the SVO Analysis Module 122C of the Snippet Extraction Module 122 may be used by modules of the Aspect Extraction Module 124 to extract Aspects of one or more sentences S.

The Aspect Extraction Module 124 may extract Aspects of one or more sentences S based, in part, on analysis of the SVO triples generated by the SVO Analysis Module 122C. As described above, according to one embodiment, an Aspect may correspond to an n-gram generated using a subject of a given text, such as the sentence S. The Aspect Extraction Module 124 may extract Aspects of S using one or more of the following modules: a Comparison Module 124A, a Subject Extraction Module 124B, a Tokenization & Normalization Module 124C, an n-gram Generation Module 124D, a Frequency Analysis Module 124E, and an Aspect Selection Module 124F.

For each sentence S analyzed by the SVO Analysis Module 122C, the Comparison Module 124A may compare the sentence's verb identified in its corresponding SVO triple to verbs stored in a list of predefined verbs. Any sentence S whose verb, as identified in its SVO triple, matches a predefined verb, may be selected by the Opinion Analysis Module 120 for further processing and provided to the Subject Extraction Module 124B. The list of predefined verbs may be stored in the Database 116, and may include one or more verbs that are of interest in a particular embodiment of the present disclosure. Where a particular embodiment is used to perform sentiment analysis, for example, a verb of interest may be selected based on how well it is believed to correlate to statements expressing a relevant opinion towards the verb's subject when used in a sentence.

For example, in the case of an embodiment where the Text Collection 112 is a collection of product reviews, the list of predefined verbs may include one or more of the following verbs and their lemmas: {make, cost, last, weigh, measure}. These verbs may be included in the list of predefined verbs because their use may be indicative of information that is relevant to interesting characteristics of a product review. For example, when used in a sentence of a product review, the use of these verbs may indicate the product's properties such as its material, cost, durability, weight, and dimensions, respectively. Other verbs that identify other properties, such as the product's color, may not be particularly interesting and may be omitted from the list because it may be, for example, that the product is used as an internal component of another product and is typically not visible.

In the case of $S_1$, above, the verb "make" (which is the normalized/lemmatized form of "made") of the SVO triple <the display, make, glass>, may be on the predefined list (alternatively, both "make" and "made" may be the list). Accordingly, the Comparison Module 124A may select $S_1$ as a sentence whose corresponding SVO triple contains an identified verb, where the verb and/or its lemma matches a predefined verb. The Comparison Module 124A may provide the selected $S_1$ to the Subject Extraction Module 124B for further processing.

The Subject Extraction Module 124B may process any sentence S whose verb, or a lemmatized form thereof, contained in a corresponding SVO triple, matches a predefined verb as determined by the Comparison Module 124A. The Subject Extraction Module 124B may identify the subject of the sentence S, contained in the corresponding SVO triple, as an Aspect candidate C. Accordingly, in an exemplary embodiment, an Aspect candidate C may be defined as a subject within an SVO triple that relates to a verb of interest, where the verb is defined as a verb of interest in a predefined list. For example, in the case of $S_1$, above, the Subject Extraction Module 124B may identify "the display" as an Aspect candidate $C_1$, where "the display" is the subject in $S_1$'s SVO triple <the display, make, glass>, and where "make" (which is a normalized/lemmatized form of "made") is included in the list of predefined verbs.

The Tokenization & Normalization Module 124C tokenizes and normalizes each Aspect candidate C identified by the Subject Extraction Module 124B. Tokenization and normalization of an Aspect candidate may be useful because, for example, they enable the Aspect Extraction Module 124 to generate corresponding n-grams in the n-gram Generation Module 124D. Tokenization and normalization may be performed using a linguistics tool having a set of definitions and rules for tokenizing and normalizing. In one embodiment of the present disclosure, the tool and/or its definitions may be stored as part of the Aspect Extraction System 100 (FIG. 1).

Tokenization may include breaking a text stream (e.g., an Aspect candidate) into constituent elements or tokens, such as symbols, words, phrases, clauses, or other meaningful elements, and/or generating symbols, abbreviations, or acronyms based on such tokens. For example, the string "a b" may be tokenized into {a, [space], b}. As a further example, the string "(C)", may be tokenized as the symbol "©".

Normalization may include identifying, for a given text element such as a word, a common element that relates the word to one or more other words (or other text elements, such as a symbol, abbreviation, or acronym). Normalization may include, for example, stemming and/or lemmatization. Stemming generally refers to a process whereby a trailing segment of a word is removed, with the word's "stem" remaining. For example, stemming the verb "marketing" may yield one or more of the following stems, among others: {market, marke, mark, ma, m}. Some of these stems may be useful in relating the verb "marketing" to other verbs or words such as "marketed" or "marketers", each of which may have one or more stems that match one or more stems of the verb "marketing".

Lemmatization may refer to a process whereby different inflected forms of a word are grouped together so they can be analyzed as a single item. Lemmatization may also refer to the process of determining a lemma for a given text element, such as a word. As described above, a lemma may be defined, in one embodiment of the present disclosure, as a canonical form, dictionary form, or citation form of a set of words. Such words may, but need not, share a stem with the lemma or with each other. For example, the word "go" is an irregular verb having conjugated forms that do not share any stem with the word "go". The word "go" may be defined as a lemma for all conjugated forms of the verb "to go", such as those in the set {go, goes, went, gone}.

According to an exemplary embodiment of the present disclosure, the tokenization and normalization functions of the Tokenization & Normalization Module 124C may be performed using the Stanford Natural Language Processing Package.

In the case of $S_1$, above, the Tokenization & Normalization Module 124C may tokenize the Aspect candidate $C_1$, "the display" (identified as an Aspect candidate by the Subject Extraction Module 124B), to yield the set of tokens {t, h, e, [space], d, i, s, p, l, a, y}. Based on the tokenization, the Tokenization & Normalization Module 124C may normalize $C_1$. In this case, the normalized form of "the display" may be "display". In a related example, where the normalization includes lemmatization, "the display" may be lemmatized to yield "monitor" or "screen", or another word, phrase, or other text element that is defined as the lemma for "display".

The n-gram Generation Module 124D may receive the output of the Tokenization & Normalization Module 124C (for example, a tokenized and normalized Aspect candidate C) and generate one or more corresponding n-grams. An n-gram may refer to a contiguous sequence of n items from a given sequence or stream of text. According to an embodiment of the present disclosure, the n-gram Generation Module 124 may generate n-grams of size 1, 2, and 3 for any Aspect candidate C that the module receives. In the case of $C_1$, "display", which may be an Aspect candidate of $S_1$, above, the corresponding n-grams may be: {d, i, s, p, l, a, y} for n=1, {di, is, sp, pl, la, ay} for n=2, and { dis, isp, spl, pla, lay} for n=3.

The Frequency Analysis Module 124E may receive the n-grams generated by the n-gram Generation Module 124D and count how many times each n-gram appears amongst the n-grams for a set of Aspect candidates C whose n-grams have been generated be the n-gram Generation Module 124D. For example, the n-gram Generation Module 124D may generate 1,000 n-grams based on tens or hundreds of Aspect candidates selected from amongst the subjects of SVO triples corresponding to sentences of a collection of product reviews R. In this example, it may be that the n-grams {dis, spl, pla} each appear over 100 times, and that other n-grams appear with various lower frequencies.

According to an embodiment of the present disclosure, the Aspect Selection Module 124F may select the top K most frequently appearing n-grams as Aspects (the frequency may be determined by the Frequency Analysis Module 124E). The value of K may be configurable, including configurable by a user. For example, where K is 3, the Aspect Selection Module 124F may select the top 3 most frequently appearing n-grams. In the example above, these may be the n-grams {dis, spl, pla}. The Aspect Selection Module 124F may select these n-grams as Aspects. As part of the selection, the Aspect Selection Module 124F may apply a filtering criteria to the candidate n-grams before selecting them as Aspects. For example, the criteria may include making n-grams related a particular set of subjects ineligible for selection.

In a related embodiment of the present disclosure, the Aspect Selection Module 124F may base its selection of n-grams as Aspects on one or more n-grams appearing with a frequency greater than a threshold value. For example, the Aspect Selection Module 124F may select those n-grams that appear more than K times (K may be, for example, 1000).

The Aspects selected by the Aspect Selection Module 124F may also be referred to as "Extracted Aspects." Extracted Aspects may be used in a variety of ways, including, without limitation, as the raw data used in an automated visual summary of online product reviews. For example, each Extracted Aspect may be provided to a user on a display terminal as a displayed word or another visual element (e.g., a graphic), along with associated elements such as key phrases, review snippets associated with that aspect, and other related information. An Extracted Aspect and/or its associated elements may be color coded in such a visual summary to indicate a sentiment towards the Extracted Aspect and/or its associated elements. For example, where an Extracted Aspect is "display", referring to a display product, and the display has received more than 50% negative online reviews, the Extracted Aspect "display" may be represented using red font to indicate to a reader of the visual summary to quickly ascertain the majority sentiment expressed towards the "display".

Figure 3:
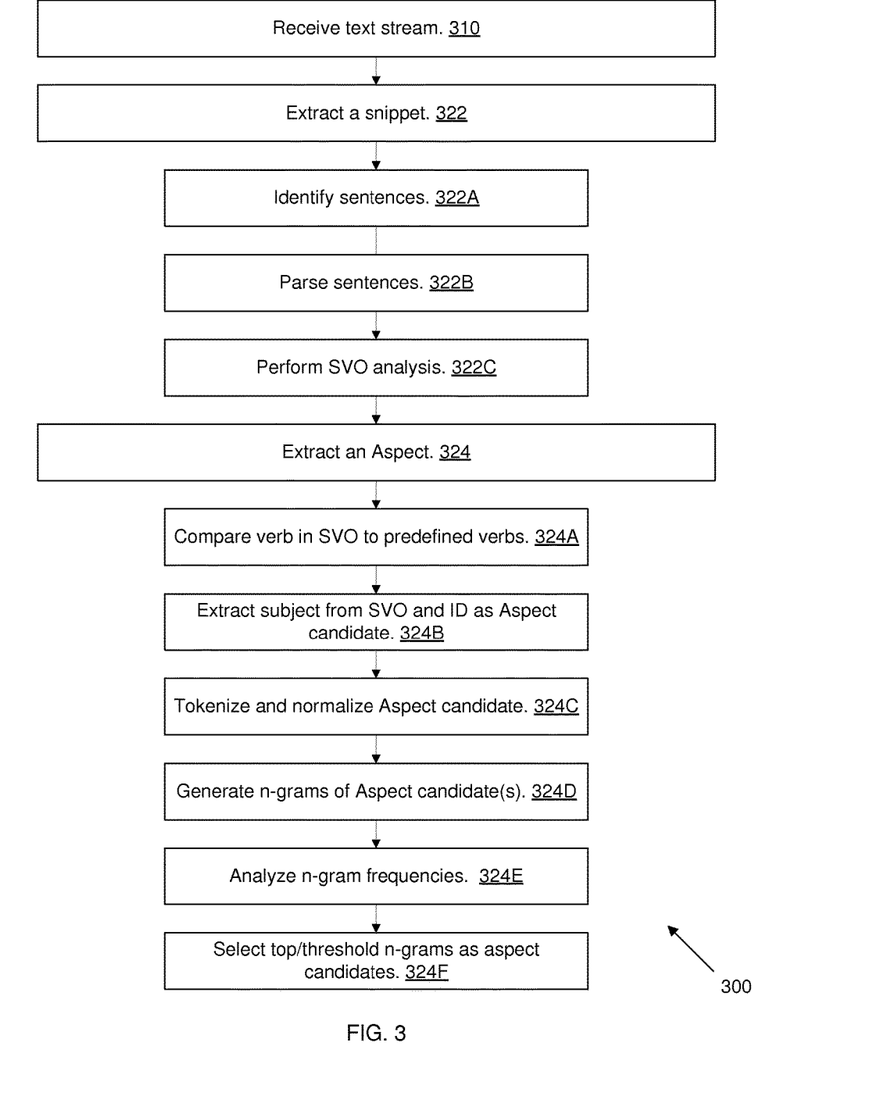
FIG. 3 is a flowchart of a method for extracting aspects from text, according to an embodiment of the present disclosure.

FIG. 3 is a flowchart of a method 300 for extracting aspects from text, according to an embodiment of the present disclosure. The method 300 may be, for example, a method implemented by the Program 102 of the Aspect Extraction System 100 (FIG. 1), and may use the Program's 102 Data Storage Module 110 and the Opinion Analysis Module 120.

The method 300 may receive, in step 310, a text stream from a text source, such as the Storage Device 130 (FIG. 1), via the Data Storage Module 110. The text stream may include characters, words, phrases, clauses, sentences, paragraphs, or any other grouping of text data. In one embodiment, the text stream may include the Text Collection 112 (FIG. 1), which may include a collection of product reviews. Each product review may include one or more sentences associated with a product.

The method 300 may extract snippets, in step 322, from the text collection the method receives in step 310. A text snippet may refer to a discrete portion of the text stream. A text snippet may include, for example, a sentence, a paragraph, a phrase, etc. In the example where the text stream is a set of product reviews, each snippet may correspond to a single review. Snippets may be extracted at multiple boundaries. For example, each product review may be a snippet, and may itself include snippets corresponding to sentences within the product review.

According to an embodiment of the disclosure, the snippet extraction function of step 322 may be facilitated, in part, by identifying sentences in the text stream that the method receives, in step 322A. Text boundaries may be determined using, for example, a language processing tool, such as the Stanford Parser and its variants (e.g., Stanford CoreNLP). For example, the method 300 may receive the following text stream and identify three corresponding sentences $S_1$, $S_2$, and $S_3$: "The display is made from highly damage-resistant glass. The display is expensive. It takes one hour for the device to fully charge.", wherein each sentence is followed by a period.

The method 300 may parse, in step 322B, sentences identified in step 322A. Parsing may be performed using, for example, the Stanford Parser. The parsing may generate a parse tree for each sentence that identifies the sentence's structure, constituent elements (e.g., words, punctuation marks, etc.), and each constituent element's significance (e.g., grammatical role).

The method 300 may perform a subject-verb-object (SVO) analysis, in step 322C, for each sentence parsed in step 322B. The SVO analysis may include determining, based on the parse tree for a given sentence, the sentence's subject, verb, and object, to generate a corresponding SVO triple. For example, the sentence $S_1$, "The display is made of highly damage-resistant glass." may have the following SVO triple: <the display, make, glass>. Note that the verb in the SVO triple of a sentence may be a normalized and/or lemmatized form of the actual form of the verb used in the sentence. In this example, "make" may be the normalized/lemmatized form of "made".

In step 324, the method 300 may extract an Aspect from the text received in step 310, based on snippets of text extracted in step 322 (including steps 322A-C). According to an exemplary embodiment, the method 300 may perform the Aspect extraction via a set of one or more sub-steps, as follows.

According to an embodiment of the disclosure, for each identified and parsed sentence having an SVO triple, the method 300 may compare, in step 324A, the verb of the SVO triple to a predefined list of verbs to determine whether there is a match. If a match is identified, the corresponding sentence may be selected for further processing by the method 300. Otherwise, it may be ignored.

The predefined list may be a compilation of verbs of interest. Whether a verb is of interest depends on the embodiment of the disclosure and the purpose for which the method 300 is used. For example, where the method 300 is used in an embodiment to aid in performing sentiment analysis of product reviews, the predefined verbs may include those verbs which may be indicative of sentiment expressed towards a characteristic of products. For example, the verb "make" or its variants (e.g., "made") may be indicative of a product's constituent material. It may be desirable to ascertain sentiments towards this characteristic of the product. In this example, the verb "make" may be included in the predefined list. In the case of $S_1$, for example, the method 300 may determine, in step 324A, that there is a match.

The method 300 may extract, in step 324B, the subject of any sentence whose SVO contains a verb matching a verb in the predefined list of verbs, as determined in step 324A, above. The extracted subject may be identified, in step 324B, as an Aspect candidate. For example, the method 300 may identify "the display", which is the subject in the SVO of $S_1$, above, as an Aspect candidate.

In step 324C, the method 300 may tokenize and lemmatize the Aspect candidate identified in step 324A. Tokenization of the aspect candidate may include, for example, identifying its constituent parts. For example, the Aspect candidate "the display" may be tokenized as {t, h, e, [space], d, i, s, p, l, a, y}. According to an exemplary embodiment of the disclosure, normalization of the aspect candidate may include lemmatization and/or stemming. For example, "the display" may be normalized/lemmatized to "display".

In step 324D, the method 300 may generate one or more n-grams of the Aspect candidate identified in step 324B and tokenized and normalized in step 324C. According to an embodiment of the disclosure, these may be n-grams of size 1, 2, and/or 3. For example, "the display" may have the following n-grams: {d, i, s, p, l, a, y} for n=1, {di, is, sp, pl, la, ay} for n=2, and {dis, isp, spl, pla, lay} for n=3.

In step 324E, the method 300 may analyze the frequency with which each generated n-gram appears amongst the n-grams generated for all sentences of the received text stream whose sentences have included an SVO triple yielding an Aspect candidate. For example, the method 300 may determine that the n-grams {dis, spl, pla} each appear over 100 times, and that other n-grams appear with various lower frequencies.

In step 324F, the method 300 may select a set of the generated n-grams as Aspects. An Aspect selected by the method 300 may be said to have been "extracted". According to an exemplary embodiment of the disclosure, selection of Aspects from amongst n-grams of Aspect candidates may be based on the top K most frequently appearing n-grams. For example, the top-3 most frequently appearing n-grams may be selected as Aspects. The value of K may be configurable, including configurable by a user.

In a related embodiment, the selection of Aspects from n-grams of Aspect candidates may be based on such n-grams exceeding a threshold value. The threshold value may be configurable, including configurable by a user. For example, the method 300 may select any n-gram (the number of selected n-grams may be capped) whose frequency is above a threshold value.

Figure 4:
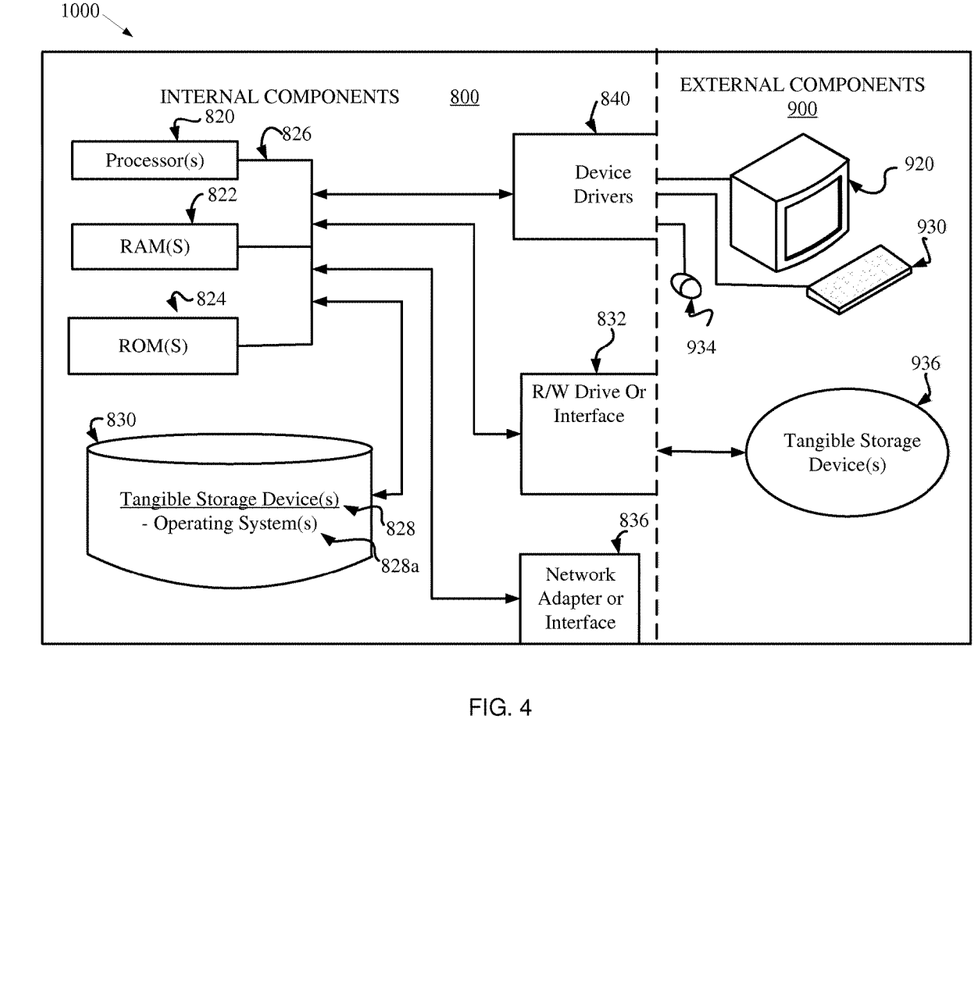
FIG. 4 is a block diagram of a computing device, according to an embodiment of the present disclosure.

Referring now to FIG. 4, a computing device 1000 may include respective sets of internal components 800 and external components 900. The computing device 1000 may be or may include, for example, the Aspect Extraction System 100 (FIG. 1). Each of the sets of internal components 800 includes one or more processors 820; one or more computer-readable RAMs 822; one or more computer-readable ROMs 824 on one or more buses 826; one or more operating systems 828; one or more software applications 828a (e.g., device driver modules) executing the program 120 (FIGS. 1-2); and one or more computer-readable tangible storage devices 830. The one or more operating systems 828 and device driver modules are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
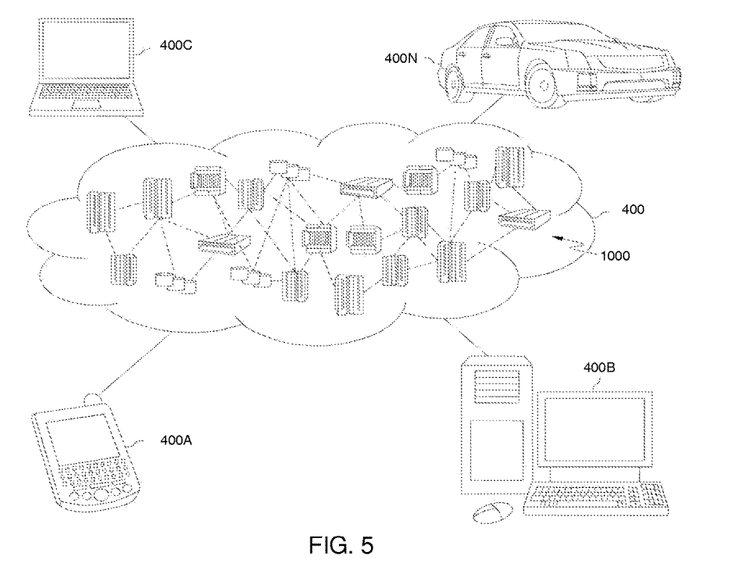
FIG. 5 is a schematic block diagram of an illustrative cloud computing environment, according to an embodiment of the present disclosure.

Referring now to FIG. 5, an illustrative cloud computing environment 400 is depicted. As shown, the cloud computing environment 400 comprises one or more cloud computing nodes, each of which may be a computing Aspect Extraction System 1000 (FIG. 4) with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that the computing nodes 1000 and the cloud computing environment 400 can communicate with any type of computerized device over any type of network and/or network addressable connection (e.g., using a web browser).

Figure 6:
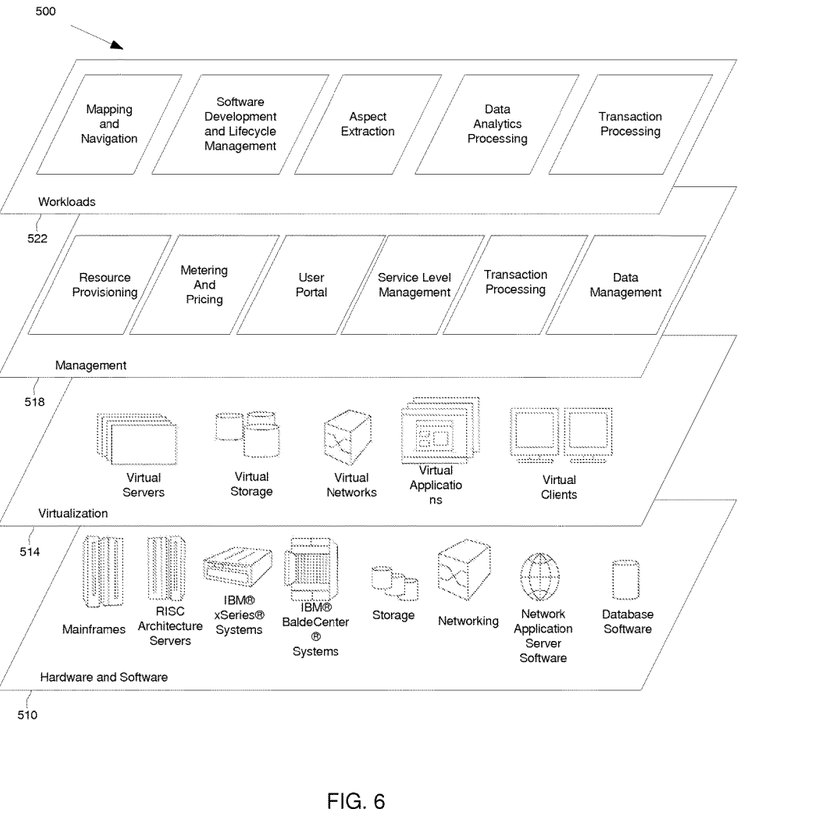
FIG. 6 is a multi-layered functional illustration of the cloud computing environment depicted in FIG. 5, according to an embodiment of the present disclosure.

Referring now to FIG. 6, a set 500 of functional abstraction layers provided by the cloud computing environment 400 (FIG. 5) is shown. It should be understood in advance that the components, layers, and functions shown in FIG. 6 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Aspect extraction system (FIGS. 1-3).

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer implemented method for extracting aspects from a text stream, comprising:
   receiving a text stream having one or more sentences;
   parsing one or more of the sentences to determine corresponding subject-verb-object (SVO) triples comprising a subject of the sentence, an object of the sentence, and a verb in the sentence relating the subject to the object;
   selecting at least one parsed sentence from the one or more parsed sentences having a corresponding SVO triple, the verb or a lemma of the verb of the SVO triple matching at least one of a predefined verb stored in a list of predefined verbs of interest;

identifying the subject of the selected at least one parsed sentence as an aspect candidate;
tokenizing and normalizing the identified aspect candidate;
generating one or more n-grams for the tokenized and normalized aspect candidate, wherein the n-gram comprises n characters, wherein n is a number varying from 1 up to and including 3;
determining, for the generated one or more n-grams, a frequency at which the one or more n-grams is generated;
selecting a subset of the generated one or more n-grams as aspects based on the frequency with which the one or more n-grams are generated; and
displaying the selected subset of the generated one or more n-grams as a visual display, wherein the generated one or more n-grams is displayed in a color to indicate the sentiment associated with the one or more n-grams, and wherein the visual display includes key phrases and review snippets associated with the aspect.

2. The method of claim 1, wherein the normalizing includes lemmatization.

3. The method of claim 1, further comprising filtering one or more of the identified aspect candidates and the selected aspects, based on a filtering criteria.

4. The method of claim 1, wherein the text stream includes online product reviews.

5. The method of claim 1, wherein the text stream includes posts on a discussion forum.

6. The method of claim 1, wherein the text stream includes a set of digital text documents.

7. The method of claim 1, wherein the text stream includes a set of social media posts.

8. A computer system for extracting aspects from a text stream, comprising:
a computer device having a processor and a tangible storage device, wherein the computer is attached to a first object; and
a program embodied on the storage device for execution by the processor, the program having a plurality of programming instruction including instructions to:
receive a text stream having one or more sentences;
parse one or more of the sentences to determine corresponding subject-verb-object (SVO) triples comprising a subject of the sentence, an object of the sentence, and a verb in the sentence relating the subject to the object;
select at least one parsed sentence from the one or more parsed sentences having a corresponding SVO triple, the verb or a lemma of the verb of the SVO triple matching at least one of a predefined verb stored in a list of predefined verbs of interest;
identify the subject of the selected at least one parsed sentence as an aspect candidate;
tokenize and normalized the identified aspect candidate;
generate one or more n-grams for the tokenized and normalized aspect candidate, wherein the n-gram comprises n characters, wherein n is a number varying from 1 up to and including 3;
determine, for the generated one or more n-grams, a frequency at which the one or more n-grams is generated;
select a subset of the generated one or more n-grams as aspects based on the frequency with which the one or more n-grams-are generated; and
display the selected subset of the generated one or more n-grams as a visual display, wherein the generated one or more n-grams is displayed in a color to indicate the sentiment associated with the one or more n-grams, and wherein the visual display includes key phrases and review snippets associated with the aspect.

9. The system claim 8, wherein the normalizing includes lemmatization.

10. The system of claim 8, further comprising filtering one or more of the identified aspect candidates and the selected aspects, based on a filtering criteria.

11. The system of claim 8, wherein the text stream includes online product reviews.

12. The system of claim 8, wherein the text stream includes posts on a discussion forum.

13. The system of claim 8, wherein the text stream includes a set of digital text documents.

14. The system of claim 8, wherein the text stream includes a set of social media posts.

15. A computer program product for extracting aspects from a text stream, comprising a non-transitory tangible storage device having program code embodied therewith, the program code executable by a processor of a computer to perform a method comprising:
receiving, by the processor, a text stream having one or more sentences;
parsing, by the processor, one or more of the sentences to determine corresponding subject-verb-object (SVO) triples comprising a subject of the sentence, an object of the sentence, and a verb in the sentence relating the subject to the object;
selecting, by the processor, at least one parsed sentence from the one or more parsed sentences having a corresponding SVO triple, the verb or a lemma of the verb of the SVO triple matching at least one of a predefined verb previously stored in a list of predefined verbs of interest;
identifying, by the processor, the subject of the selected at least one parsed sentence as an aspect candidate;
tokenizing and normalizing, by the processor, the identified aspect candidate;
generating, by the processor, one or more n-grams for the tokenized and normalized aspect candidate, wherein the n-gram comprises n characters, wherein n is a number varying from 1 up to and including 3;
determining, by the processor, for the generated one or more n-grams, a frequency at which the one or more n-grams is generated;
selecting, by the processor, a subset of the generated one or more n-grams as aspects based on the frequency with which the one or more n-grams are generated; and
displaying, by the processor, the selected subset of the generated one or more n-grams as a visual display, wherein the generated one or more n-grams is displayed in a color to indicate the sentiment associated with the one or more n-grams, and wherein the visual display includes key phrases and review snippets associated with the aspect.

16. The computer program product of claim 15, wherein the normalizing includes lemmatization.

17. The computer program product of claim 15, further comprising filtering, by the processor, one or more of the identified aspect candidates and the selected aspects, based on a filtering criteria.

18. The computer program product of claim 15, wherein the text stream includes online product reviews.

19. The computer program product of claim 15, wherein the text stream includes posts on a discussion forum.

20. The computer program product of claim 15, wherein the text stream includes a set of digital text documents.

* * * * *